United States Patent Office 2,744,150
Patented May 1, 1956

2,744,150
PREPARATION OF m- AND p-DIISOPROPYL-BENZENE

Herman I. Enos, Jr., Wilmington, Del., assignor to Hercules Powder Company, Wilmington, Del., a corporation of Delaware No Drawing. Application June 29, 1953,
Serial No. 364,965

7 Claims. (Cl. 260—671)

This invention relates to the production of diisopropylbenzene and more particularly to the preparation of m-diisopropylbenzene and p-diisopropylbenzene.

The production of diisopropylbenzene for use as an antiknock fuel by alkylation of benzene with refinery gas is well known. However, the processes of the prior art have always led to mixtures of isomers from which the individual isomers were not separatble in a pure state by distillation processes. The m-isomer, for instance, which is particularly desired for use as an intermediate for chemical syntheses by oxidation reactions, is not separable from the o-isomer by distillation nor from trimethylindane which is formed as a by-product from the o-isomer in the prior art processes. The presence of the o-isomer and trimethylindane was not recognized heretofore. In copending application, Serial No. 364,941 is described and claimed a process for the propylation of benzene to a mixture of diisopropylbenzene isomers free of the o-isomer and free of trimethylindane and from which m-diisopropylbenzene is readily separated by distillation. This process uses aluminum chloride as a catalyst in an amount within a critical range and a temperature in the range of 65–115° C. Under these conditions refinery gas cannot be used as the source of propylene, however, because other unsaturates present in the refinery gas also combine with the benzene ring. Thus to attain the advantages of this process for producing a mixture containing no o-isomer or trimethylindane, this cheap source of propylene cannot be used directly.

Now in accordance with the present invention, it has been found that m-diisopropylbenzene can be produced by a process which makes use of refinery gas as an economical source of propylene, which process involves alkylating benzene with refinery gas to polyisopropylbenzene using a catalyst effective for the reaction, separating the polyisopropylbenzene and contacting it in admixture with benzene with 0.1 to 2 mole per cent of the alkylation mixture of aluminum chloride at a temperature in the range of 65–115° C. until a mixture rich in m-diisopropylbenzene and substantially free of o-diisopropylbenzene and trimethylindane is attained, and separating the m-diisopropylbenzene from the resulting reaction product by distillation.

The process essentially involves an alkylation step and a disproportionation step. The alkylation step removes the propylene from the refinery gases, and the polyisopropylbenzene, acting as a carrier for the propyl radicals, transfers these radicals to the admixed benzene in the disproportionation reaction. The polyisopropylbenzene thus is deprived of part of its isopropyl radicals and the benzene acquires isopropyl radicals. The net result is a mixture rich in m- and p-diisopropylbenzenes from which the m-diisopropylbenzene is separated by distillation.

The crude product of the disproportionation step on distillation yields benzene, cumene, p-diisopropylbenzene and polyisopropylbenzene in addition to the m-diisopropylbenzene which is separated. If desired, the p-diisopropylbenzene may also be separated while the other products are recycled to the disproportionation step. Alternatively, the p-diisopropylbenzene may also be recycled. In a smoothly operating process, it is preferable to recycle at least the benzene, cumene, and polyisopropylbenzene to the disproportionation step. If desired, the p-diisopropylbenzene may be separated in the pure state or it may be isomerized in a separate isomerization step to m-diisopropylbenzene by contact with 0.1 to 2 mole per cent of its weight of aluminum chloride at 65–115° C. Such a step is described and claimed in copending application, Serial No. 364,961.

Since the triisopropylbenzene and tetraisopropylbenzene produced in the alkylation of benzene are readily purified, this step is not critical. However, the disproportionation reaction between benzene and the polyisopropylbenzene to produce a mixture from which m-diisopropylbenzene is readily separable by distillation is critical and is carried out by contacting the benzene-polyisopropylbenzene mixture with 0.1 to 2 mole per cent based on the moles benzenoid material in the reaction mixture of aluminum chloride at a temperature in the range of 65–115° C. for a time sufficient to produce a mixture containing substantial amounts of m-diisopropylbenzene and substantially no o-diisopropylbenzene and no trimethylindane.

The critical conditions of the process are the temperature range and the amount and type of catalyst used. Aluminum chloride is required for the production of a product substantially free of o-diisopropylbenzene which boils so close to m-diisopropylbenzene as to make separation impossible if more than a trace of o-diisopropylbenzene is present. The temperature is critical in that it is only in the range of 65–115° C. that m-diisopropylbenzene is formed in substantial amounts and the o-isomer is substantially absent. At lower temperatures there is an increasingly larger proportion of the o-isomer produced and this isomer prevents the separation of the m-isomer in pure form. At higher temperatures there is a greater tendency for by-product formation.

The amount of aluminum chloride is also critical in that more than 2 mole percent based on the benzenoid components of the reaction mixture causes by-product formation even in the 65–115° C. range which is necessary for the production of the favorable isomer ratio. The main by-product which is found to be formed due to an excess of aluminum chloride is trimethylindane which apparently is formed by the interaction of the isopropyl radicals in the o-isomer. This trimethylindane boils along with m-diisopropylbenzene in fractional distillation and is not separable by any known process of distillation. Its presence is readily detected by infrared absorption analysis.

The process of this invention may be expressed in detail by the following flow sheet:

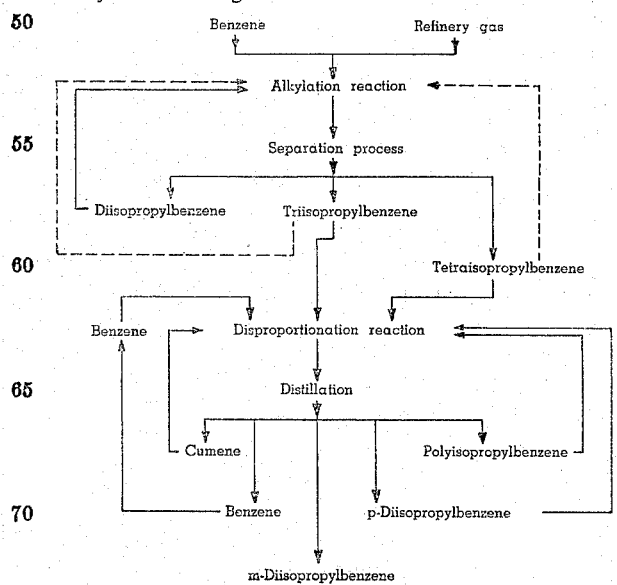

The propylene-containing gas used in the alkylation step for the production of polyisopropylbenzene must be free of higher molecular weight unsaturates which might also react, but the gas may contain ethylene from which the propylene will be removed due to its greater reactivity. The process of this invention is particularly well adapted for use of refinery gases which are mixtures of ethylene, propylene and saturated hydrocarbon gases. The term "refinery gas" is used herein to include only such gases as are free of higher unsaturates such as butene or butadiene. Such a refinery gas can be readily obtained from a gas containing these higher molecular weight unsaturated gases by well-known selective adsorption methods whereby the higher molecular weight unsaturates are removed.

In the production of polyisopropylbenzene free of trimethylindane in the first alkylation reaction, certain of the catalysts known in the art may be used provided the temperature is not allowed to rise so high as to cyclize the o-diisopropylbenzene initially present and provided the amount of catalyst is not so high as to catalyze this objectionable side reaction. Polyisopropylbenzene, produced at as low a temperature and with as small an amount of catalyst as will bring about alkylation, will be free of trimethylindane but higher temperatures are also satisfactory. Broadly, the reaction temperature for the production of polyisopropylbenzene free of trimethylindane is selected from the range of 30°–115° C. depending on the particular alkylation catalyst used and on the amount thereof. For instance, with 80% sulfuric temperatures of 50–80° C. may be used, with $AlCl_3$ temperatures up to about 115° C. may be used when the catalyst concentration is 0.1 to 2% $AlCl_3$, or temperatures below about 50° C. may be used with 5 to 10% $AlCl_3$. In order to avoid alkylation with ethylene in the refinery gas, it is particularly important to use the milder of the effective alkylation conditions set forth or else strip only part of the propylene out of the gas by maintaining an excess of propylene in the effluent gases by using very short contact time, low temperatures or low catalyst content. Conditions for selective reaction with the propylene are well known in the art. The most economical and satisfactory catalyst for the preparation of polyisopropylbenzene without contamination by ethylene condensation products is sulfuric acid of about 80% strength. This catalyst does not cause contamination with triethylbenzene.

The polyisopropylbenzene prepared in the first step of this invention may be triisopropylbenzene or tetraisopropylbenzene or mixtures containing the two. The propylation is carried out to such an extent as to produce the desired composition. The reaction product is purified by distilling off the low boiling fraction in either case and the low boiling fraction is recycled to the alkylation step. The high boiling polyisopropylbenzene fraction is then used in the disproportionation reaction with benzene. The composition with respect to the relative amounts of triisopropylbenzene and tetraisopropylbenzene in the polyisopropylbenzene fraction is not critical. The advantage in the use of triisopropylbenzene in the disproportionation step in that triisopropylbenzene is substantially entirely the 1,3,5-isomer which on loss of one isopropyl group gives m-diisopropylbenzene without further isomerization. The advantage in the use of tetraisopropylbenzene is that tetraisopropylbenzene is very easily obtained in a high state of purity by crystallization from the mother liquor. Triisopropylbenzene, on the other hand, may be purified by distillation, if desired, before being used in the disproportionation step and if sufficient tetraisopropylbenzene is present in the distillation residue, it may be purified by crystallization. Regardless of which polyisopropylbenzene is used as the intermediate, the unused propylated benzenes are recycled to the alkylation step in practical operation. If the tetraisopropylbenzene is crystallized for use in the disproportionation step, the triisopropylbenzene in the mother liquor may be recycled to the alkylation step in a similar manner.

If trimethylindane is produced in the alkylation of benzene in the process of this invention, it is removed from the polyisopropylbenzene either in the distillation or crystallization purification and does not enter into the disproportionation step where it would contaminate the product. In being continuously recycled, however, it would tend to build up in the alkylation cycle and to avoid this part of the material can be continuously withdrawn from the cycle. Thus while the process prevents trimethylindane from being carried through to the final product, it is preferable to avoid its formation in the initial alkylation step.

The disproportination step of the process involves a transfer of isopropyl radicals to form an equilibrium composition. The amount of benzene required for the optimum yield of diisopropylbenzene is approximately the theoretical amount based on the amount of isopropyl radicals available in the polyisopropylbenzene. Thus the optimum molecular ratio of benzene to triisopropylbenzene is about 1:2 and the optimum molecular ratio of benzene to tetraisopropylbenzene is about 1:1. The optimum molecular ratio for mixtures is readily calculated.

The disproportionation step is carried out by mixing 0.1 to 2 mole per cent anhydrous aluminum chloride powder with the polyisopropylbenzene preferably at a temperature below about 50° C. and then allowing the temperature to rise gradually to 65–115° C at which temperature the reaction mixture is held until the resulting reaction mixture contains an equilibrium composition of approximately that set forth below. A particularly good method of operation for starting a batch is to add about 5 moles anhydrous aluminum chloride to 100 moles benzene cooled to about 10° C. and then to add the resulting mixture to 200 moles triisopropylbenzene which may be at any temperature up to about 115° C. The catalyst is added at such a rate to the triisopropylbenzene at this elevated temperature that the temperature is easily controlled. The triisopropylbenzene-aluminum chloride mixture should not be allowed to heat up above about 50° C. before being diluted with the triisopropylbenzene to the range of 0.1 to 2 mole per cent based on the benzenoid compounds with which it is mixed. The method of mixing the benzene, triisoproplybenzene, and the aluminum chloride is not limited to any particular procedure, the only precaution to be observed is that the mole per cent of aluminum chloride be kept in the range of 0.1 to 2 mole per cent while the temperature is in the 65–115° C. range and preferably at any time the temperature is above about 50° C. for any appreciable period of time.

The reaction mixture, after it has approximately reached equilibrium, is worked up by removing the catalyst by decantation or filtration with or without subsequent washing of the product, or by any of the well known methods such as dilution with water, preferably containing acid or caustic to dissolve the aluminum hydroxide produced. The catalyst-free product after separation from the aqueous layer is then freed of water, by drying agent or by distilling. The products are then fractionally distilled to separate 3.9 moles benzene, 38.1 moles cumene, 68.4 moles m-diisopropylbenzene, 37.2 moles p-diisopropylbenzene, 39.6 moles triisopropylbenzene, and 1.2 moles tetraisopropylbenzene. The m-diisopropylbenzene is recovered and may be refractionated if the first fractionation is inadequate. The p-diisopropylbenzene may also be recovered. In operating the process particularly for the production of m-diisopropylbenzene, the other alkylated products are recycled to the disproportionation reaction along with fresh benzene.

In continuing the disproportionation reaction with recycle of the benzene, cumene, and higher alkylated benzenes from which the m-diisopropylbenzene was separated, 22.8 moles benzene additionally is required and 45.6 moles triisopropylbenzene from the alkylation is required.

Similarly in the use of tetraisopropylbenzene, about 5 moles anhydrous aluminum chloride is dispersed in 150 moles of benzene and this is mixed with 150 moles of tetraisopropylbenzene, and the mixture is heated in the range of 65–115° C. until the reaction mixture contains a substantial amount of m-diisopropylbenzene and is substantially free of o-diisopropylbenzene. The reaction mixture is worked up by removing the catalyst in the usual way followed by distillation with removal of about 68.4 moles m-diisopropylbenzene and recycle of the other products to the disproportionation reaction. In continuing the cycle, 34.2 moles benzene and 34.2 moles tetraisopropylbenzene are added to the disproportionation to provide 68.4 moles of m-diisopropylbenzene.

A particularly satisfactory method of producing tri- and tetra-isopropylbenzene is to mix 100 lb. benzene with 100 lb. 80% sulfuric acid and then pass refinery gas containing propylene and ethylene as the only unsaturated components into the reaction mixture at 30–40° C. The refinery gas is added until the mixture begins to crystallize showing the presence of tetraisopropylbenzene. The tetraisopropylbenzene is crystallized out and is used directly for the disproportionation reaction with benzene. The residue is further treated with refinery gas with the addition of more benzene until crystals are again formed. These are crystallized out as before. Alternatively, the mother liquor from which the crystals were removed is washed free of catalyst and distilled. The triisopropylbenzene fraction is separated for use in the disproportionation reaction or the combined fractions rich in triisopropylbenzene and tetraisopropylbenzene are used in the disproportionation reaction. In the latter instance, only the lower boiling products of the alkylation reaction need be distilled. Careful purification by distillation of the separate fractions is ordinarily not necessary since the common impurities are readily removed by distillation up to the boiling range of the triisopropylbenzene and the residue is then useful for the disproportionation reaction with benzene.

The composition of the disproportionation mixture at temperatures of 80° and 100° C. in the disproportionation reaction step is set forth in Table 1.

Table 1

| Component | Mole Percent at T.° C. | |
| --- | --- | --- |
|  | 80° C. | 100° C. |
| Benzene | 2.0 | 2.0 |
| Cumene | 18.5 | 18.5 |
| m-Diisopropylbenzene | 37.2 | 37.2 |
| p-Diisopropylbenzene | 18.6 | 18.6 |
| Triisopropylbenzene | 21.0 | 21.0 |
| Tetraisopropylbenzene | 0.6 | 0.6 |

The aluminum chloride catalyst is anhydrous aluminum chloride and is used in an amount within the range of about 0.1 to 2 mole per cent and preferably in the range of about 0.3 to 0.8 mole per cent.

The temperature of the disproportionation reaction is a temperature in the range of 65–115° C. and preferably a temperature in the range of 80–115° C.

In carrying out the process of this invention, the lower concentration of aluminum chloride catalyst in the range set forth is used with the higher temperatures in the range set forth, and the higher concentration of aluminum chloride catalyst in the range set forth is used with the lower temperatures in the range set forth. Thus, 0.1 mole per cent aluminum chloride used at a reaction temperature of 115° C. and 2 mole per cent of aluminum chloride used at a reaction temperature of 65° C. will produce in either case a mixture of m- and p-diisopropylbenzene substantially free of o-diisopropylbenzene and trimethylindane from which m- and p-diisopropylbenzene are separable in substantially pure form.

The process of this invention is particularly useful in providing a means for using a cheap source of propylene without use of any additional source. The polyisopropylbenzene produced in the alkylation step acts essentially as a carrier for propylene in the process thus making it possible to produce m-diisopropylbenzene from refinery gas.

While the process of this invention is equally satisfactory for the production of both m- and p-diisopropylbenzene, it is particularly valuable for the production of m-diisopropylbenzene which is the more difficult of the two isomers to produce in the pure state.

Unless stated otherwise all percentages are by weight.

What I claim and desire to protect by Letters Patent is:

1. The method of preparing a diisopropylbenzene substantially free of o-diisopropylbenzene and trimethylindane which comprises propylating benzene in an alkylation reaction with a propylene-containing gas, containing no higher molecular weight unsaturates, at as low a temperature in the range of 30°–150° C. and in the presence of as small an amount of an alkylation catalyst as will bring about alkylation to a mixture rich in polyisopropylbenzene, separating the polyisopropylbenzenes free of trimethylindane from the by-products of the alkylation reaction, contacting a disproportionation reaction mixture consisting essentially of the polyisopropylbenzenes in admixture with benzene wherein the ratio of isopropyl groups to benzene groups is approximately 2:1 with 0.1 to 2 mole per cent of the disproportionation reaction mixture of aluminum chloride at a temperature in the range of 65°–115° C. to effect a disproportionation reaction, until the disproportionation reaction mixture is enriched in m-diisopropylbenzene and is substantially free of o-diisopropylbenzene and trimethylindane, and separating at least one of the group of m-diisopropylbenzene and p-diisopropylbenzene from the disproportionation reaction mixture by distillation.

2. The process of claim 1 in which the propylene-containing gas is a refinery gas.

3. The process of claim 1 in which the alkylation catalyst is sulfuric acid.

4. The method of preparing a diisopropylbenzene substantially free of o-diisopropylbenzene and trimethylindane which comprises propylating benzene in an alkylation reaction with a propylene-containing gas, containing no higher molecular weight unsaturates, at as low a temperature in the range of 30°–150° C. and in the presence of as small an amount of an alkylation catalyst as will bring about alkylation to a mixture rich in polyisopropylbenzene, separating the polyisopropylbenzenes free of trimethylindane from the by-products of the alkylation reaction, contacting a disproportionation reaction mixture consisting essentially of the polyisopropylbenzenes in admixture with benzene wherein the ratio of isopropyl groups to benzene groups is approximately 2:1 with 0.3 to 0.8 mole per cent of the disproportionation reaction mixture of aluminum chloride at a temperature in the range of 80°–115° C. to effect a disproportionation reaction, until the disproportionation reaction mixture is enriched in m-diisopropylbenzene and is substantially free of o-diisopropylbenzene and trimethylindane, and separating at least one of the group of m-diisopropylbenzene and p-diisopropylbenzene from the disproportionation reaction mixture by distillation.

5. The method of preparing a diisopropylbenzene substantially free of o-diisopropylbenzene and trimethylindane which comprises propylating benzene in an alkylation reaction with a propylene-containing gas, containing no higher molecular weight unsaturates, at as low a temperature in the range of 30°–150° C. and in the presence of as small an amount of an alkylation catalyst as will bring about alkylation to a mixture rich in polyisopropylbenzene, separating polyisopropylbenzenes free of trimethylindane from by-products of the alkylation reaction, contacting a disproportionation reaction mixture consisting essentially of the polyisopropylbenzenes in admixture with benzene wherein the ratio of isopropyl groups to benzene groups is approximately 2:1 with 0.1 to 2 mole per cent of the disproportionation reaction mixture of aluminum chloride at a temperature in the range of 65°–115° C. to effect a disproportionation reaction until the disproportionation reaction mixture is enriched in m-diisopropylbenzene and is substantially free of o-diisopropylbenzene and trimethylindane and separating at least one of the group consisting of m-diisopropylbenzene and p-diisopropylbenzene from the disproportionation reaction mixture by distillation, and recycling at least part of the by-products of the alkylation step to the alkylation reaction and at least part of the by-products of the disproportionation step to the disproportionation reaction.

6. The method of preparing a diisopropylbenzene substantially free of o-diisopropylbenzene and trimethylindane which comprises propylating benzene in an alkylation reaction with a propylene-containing gas, containing no higher molecular weight unsaturates, at as low a temperature in the range of 30°–150° C. and in the presence of as small an amount of an alkylation catalyst as will bring about alkylation to a mixture rich in polyisopropylbenzene, separating the polyisopropylbenzenes free of trimethylindane by distilling off the lower boiling by-products of the alkylation reaction, a disproportionation reaction mixture consisting essentially of contacting the polyisopropylbenzenes in admixture with benzene wherein the ratio of isopropyl groups to benzene groups is approximately 2:1 with 0.1 to 2 mole per cent of the disproportionation reaction mixture of aluminum chloride at a temperature in the range of 65°–115° C. to effect a disproportionation reaction, until the disproportionation reaction mixture is enriched in m-diisopropylbenzene and is substantially free of o-diisopropylbenzene and trimethylindane, separating at least one of the group consisting of m-diisopropylbenzene and p-diisopropylbenzene from the disproportionation reaction mixture by distillation, and recycling at least part of the by-products of the alkylation step to the alkylation reaction and at least part of the by-products of the disproportionation step to the disproportionation reaction.

7. The method of preparing a diisopropylbenzene substantially free of o-diisopropylbenzene and trimethylindane which comprises propylating benzene in an alkylation reaction with a propylene-containing gas, containing no higher molecular weight unsaturates, at as low a temperature in the range of 30°–150° C. and in the presence of as small an amount of an alkylation catalyst as will bring about alkylation to a mixture rich in crystallized polyisopropylbenzene, separating crystallized polyisopropylbenzenes free of trimethylindane from the reaction mixture, contacting a disproportionation reaction mixture consisting essentially of the polyisopropylbenzenes in admixture with benzene wherein the ratio of isopropyl groups to benzene groups is approximately 2:1 with 0.1 to 2 mole per cent of the disproportionation reaction mixture of aluminum chloride at a temperature in the range of 65°–115° C. to effect a disproportionation reaction, until the disproportionation reaction mixture is enriched in m-diisopropylbenzene and is substantially free of o-diisopropylbenzene and trimethylindane, and separating at least one of the group consisting of m-diisopropylbenzene and p-diisopropylbenzene from the disproportionation reaction mixture by distillation.

References Cited in the file of this patent
UNITED STATES PATENTS

| Number | Name | Date |
|---|---|---|
| 2,010,948 | Egloff | Aug. 13, 1935 |
| 2,421,331 | Johnson | May 27, 1947 |
| 2,465,610 | Short et al. | Mar. 29, 1949 |

OTHER REFERENCES

Berry et al.: J. A. C. S., vol. 49, pages 3142–9 (December 1927).

Newton: J. A. C. S., vol. 65, pages 320–23 (March 1943).

Organic Reactions, vol. III, pages 3, 25 and 50 (1947), published by Wiley and Sons, Inc., New York, N. Y.

Shreve: Industrial and Eng. Chem., vol. 40, page 1569 (1948).

Condon: J. A. C. S., vol. 70, pages 2265–7 (1948).